(12) United States Patent
Seshadri et al.

(10) Patent No.: US 8,800,030 B2
(45) Date of Patent: Aug. 5, 2014

(54) INDIVIDUALIZED TIME-TO-LIVE FOR REPUTATION SCORES OF COMPUTER FILES

(75) Inventors: Vijay Seshadri, Milpitas, CA (US); Zulfikar Ramzan, Cupertino, CA (US); James Hoagland, Redwood City, CA (US); Adam L. Glick, Culver City, CA (US); Adam Wright, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 774 days.

(21) Appl. No.: 12/560,261

(22) Filed: Sep. 15, 2009

(65) Prior Publication Data

US 2011/0067101 A1   Mar. 17, 2011

(51) Int. Cl.
*G06F 11/00* (2006.01)
*H04L 29/06* (2006.01)

(52) U.S. Cl.
CPC .................... *H04L 63/1416* (2013.01)
USPC .............................................................. 726/22

(58) Field of Classification Search
USPC ............................................................. 726/22
See application file for complete search history.

(56) References Cited

U.S. PATENT DOCUMENTS

| | | | | |
|---|---|---|---|---|
| 7,953,814 | B1 * | 5/2011 | Chasin et al. | 709/207 |
| 7,953,969 | B2 * | 5/2011 | Neystadt et al. | 713/155 |
| 8,544,086 | B2 * | 9/2013 | Field | 726/22 |
| 8,621,630 | B2 * | 12/2013 | Economos et al. | 726/23 |
| 2002/0078382 | A1 * | 6/2002 | Sheikh et al. | 713/201 |
| 2005/0283837 | A1 * | 12/2005 | Olivier et al. | 726/24 |
| 2006/0253584 | A1 * | 11/2006 | Dixon et al. | 709/225 |
| 2007/0079379 | A1 * | 4/2007 | Sprosts et al. | 726/24 |
| 2007/0083929 | A1 * | 4/2007 | Sprosts et al. | 726/22 |
| 2007/0220607 | A1 * | 9/2007 | Sprosts et al. | 726/24 |
| 2008/0147612 | A1 * | 6/2008 | Gryaznov | 707/3 |
| 2008/0256622 | A1 * | 10/2008 | Neystadt et al. | 726/14 |
| 2008/0263669 | A1 * | 10/2008 | Alme | 726/24 |
| 2009/0063471 | A1 * | 3/2009 | Erickson | 707/5 |
| 2009/0187442 | A1 | 7/2009 | Kohanim et al. | |
| 2009/0282476 | A1 * | 11/2009 | Nachenberg et al. | 726/22 |
| 2010/0083376 | A1 * | 4/2010 | Pereira et al. | 726/22 |
| 2011/0040825 | A1 * | 2/2011 | Ramzan et al. | 709/203 |

FOREIGN PATENT DOCUMENTS

| | | |
|---|---|---|
| JP | 2008/500653 A | 1/2008 |
| JP | 2010-521749 A | 6/2010 |
| WO | WO 2008/113059 A1 | 9/2008 |

OTHER PUBLICATIONS

Jøsang, A. et al., "A Survey of Trust and Reputation Systems for Online Service Provision," Decision Support Systems, Elsevier Science Publishers, Feb. 10, 2007, pp. 618-644, vol. 43, No. 2.

(Continued)

*Primary Examiner* — Farid Homayounmehr
*Assistant Examiner* — Olanrewaju Bucknor
(74) *Attorney, Agent, or Firm* — Fenwick & West LLP

(57) ABSTRACT

An individualized time-to-live (TTL) is determined for a reputation score of a computer file. The TTL is determined based on the reputation score and the confidence in the reputation score. The confidence can be determined based on attributes such as the reputation score, an age of the file, and a prevalence of the file. The reputation score is used to determine whether the file is malicious during a validity period defined by the TTL, and discarded thereafter.

14 Claims, 4 Drawing Sheets

(56) References Cited

OTHER PUBLICATIONS

Jøsang, A., "Trust and Reputation Systems," Aldini, A. et al., eds., Foundations of Security Analysis and Design IV, FOSAD 2006/2007 Tutorial Lectures, Springer LNCS 4677, Sep. 2007, pp. 1-38.

PCT International Search Report and Written Opinion, PCT Application No. PCT/US2010/048475, Dec. 1, 2010, 8 pages.

Canadian Office Action, Canadian Application No. 2,770,265, Oct. 2, 2013, 4 pages.

* cited by examiner

INDIVIDUALIZED TIME-TO-LIVE FOR REPUTATION SCORES OF COMPUTER FILES

BACKGROUND

1. Field of Disclosure

The disclosure generally relates to the field of computer security, in particular to determining whether a computer file is malicious.

2. Description of the Related Art

A wide variety of malicious software (malware) can attack modern computers. Malware threats include computer viruses, worms, Trojan horse programs, spyware, adware, crimeware, and phishing websites. Malicious entities sometimes attack servers that store sensitive or confidential data that can be used to the malicious entity's own advantage. Similarly, other computers, including home computers, must be constantly protected from malicious software that can be transmitted when a user communicates with others via electronic mail, when a user downloads new programs or program updates, and in many other situations. The different options and methods available to malicious entities for attack on a computer are numerous.

Conventional techniques for detecting malware, such as signature string scanning, are becoming less effective. Modern malware is often targeted and delivered to only a relative handful of computers. For example, a Trojan horse program can be designed to target computers in a particular department of a particular enterprise. Such malware might never be encountered by security analysts, and thus the security software might never be configured with signatures for detecting such malware. Mass-distributed malware, in turn, can contain polymorphisms that make every instance of the malware unique. As a result, it is difficult to develop signature strings that reliably detect all instances of the malware.

Newer techniques for detecting malware involve the use of reputation systems. A reputation system can determine the reputation of a file encountered on a computer in order to assess the likelihood that the file is malware. One way to develop the reputation for a file is to collect reports from networked computers on which the file is found and base the reputation on information within the reports. A file's reputation can change over time as more reports are collected. There is a need for a way to efficiently provide the changing reputation scores to the networked computers and other entities that use the reputation scores to detect malware.

SUMMARY

Embodiments of the present disclosure include methods (and corresponding systems and computer program products) for generating and utilizing individualized time-to-lives (TTLs) for reputation scores of computer files.

One aspect of the present disclosure is a computer-implemented method for generating an individualized time-to-live (TTL) for a reputation score of a file, comprising: receiving a request from a client system, the request comprising an identifier of the file; generating a reputation score of the file, the reputation score representing an assessment of a trustworthiness of the file; determining a TTL for the reputation score based on the reputation score, the TTL describing a validity period for the reputation score; and transmitting the reputation score and the TTL to the client system in response to the request.

Another aspect of the present disclosure is a computer system for generating an individualized time-to-live (TTL) for a reputation score of a file, comprising: a computer-readable storage medium comprising executable computer program code for: a communication module for receiving a request from a client system, the request comprising an identifier of the file; a reputation score generation module for generating a reputation score of the file, the reputation score representing an assessment of a trustworthiness of the file; and a TTL determination module for determining a TTL for the reputation score based on the reputation score, the TTL describing a validity period for the reputation score; wherein the communication module is further configured for transmitting the reputation score and the TTL to the client system in response to the request.

Still another aspect of the present disclosure is a computer-readable storage medium encoded with executable computer program code for generating an individualized time-to-live (TTL) for a reputation score of a file, the computer program code comprising program code for: receiving a request from a client system, the request comprising an identifier of the file; generating a reputation score of the file, the reputation score representing an assessment of a trustworthiness of the file; determining a TTL for the reputation score based on the reputation score, the TTL describing a validity period for the reputation score; and transmitting the reputation score and the TTL to the client system in response to the request.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
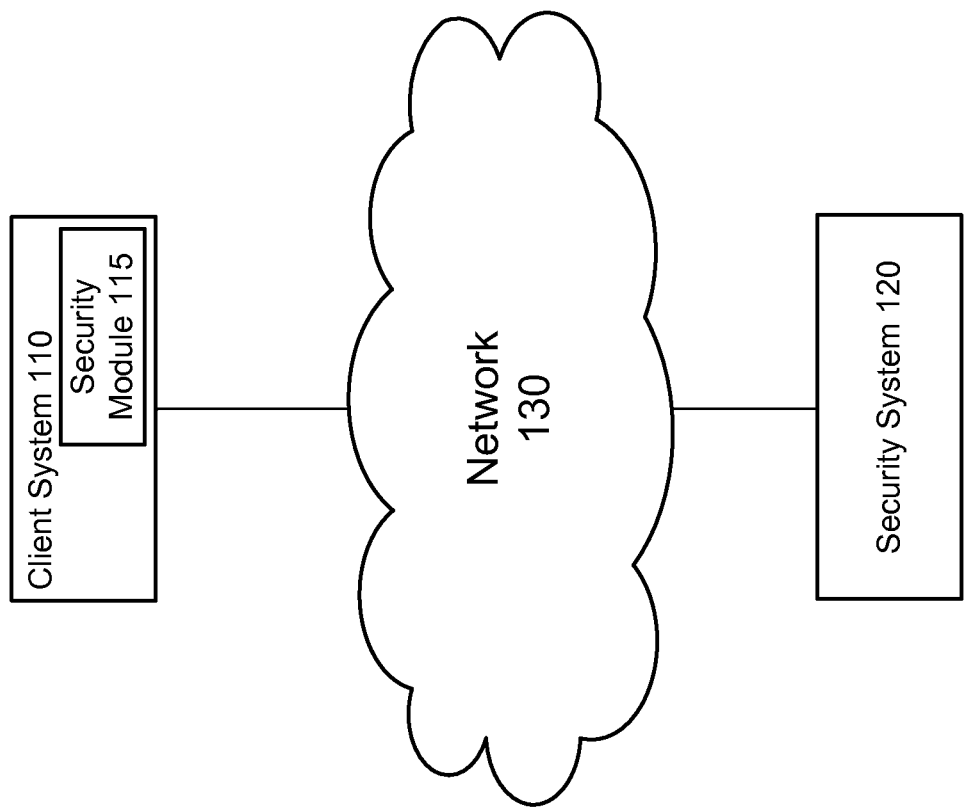
FIG. 1 is a high-level block diagram of a computing environment according to one embodiment of the present disclosure.

FIG. 1 is a high-level block diagram that illustrates a computing environment 100 for generating and utilizing an individualized time-to-live (TTL) for a reputation score of a computer file, according to one embodiment of the present disclosure. As shown, the computing environment 100 includes a client system 110 and a security system 120 connected through a network 130. Only one of each entity is illustrated in order to simplify and clarify the present description. There can be other entities in the computing environment 100 as well.

The client system 110 is an electronic device that can host malicious software. In one embodiment, the client system 110 is a conventional computer system executing, for example, a Microsoft Windows-compatible operating system (OS), Apple OS X, and/or a Linux distribution. In another embodiment, the client system 110 is another device having computer functionality, such as a personal digital assistant (PDA), mobile telephone, video game system, etc. The client system 110 typically stores numerous computer files that can host malicious software.

Malicious software, sometimes called "malware," is generally defined as software that executes on the client system 110 surreptitiously or that has some surreptitious functionality. Malware can take many forms, such as parasitic viruses that attach to legitimate files, worms that exploit weaknesses in the computer's security in order to infect the computer and spread to other computers, Trojan horse programs that appear legitimate but actually contain hidden malicious code, and spyware that monitors keystrokes and/or other actions on the computer in order to capture sensitive information or display advertisements.

The client system 110 executes a security module 115 for detecting the presence of malware. The security module 115 can be, for example, incorporated into the OS of the computer or part of a separate comprehensive security package. In one embodiment, the security module 115 is provided by the entity that operates the security system 120. The security module 115 can communicate with the security system 120 via the network 130.

In one embodiment, the security module 115 transmits a request for a reputation score of a file to the security system 120, and receives the reputation score and an associated TTL in return. The security module 115 determines whether the file is malicious based on the received reputation score during the period of time defined by the TTL (called the validity period) and other factors such as observed behaviors of the file, and discards the reputation score thereafter.

The reputation score represents an assessment of the trustworthiness of the associated file. For example, the reputation score can be a continuous value ranging from 0 to 1, which a score of 0 indicating a very low trustworthiness (e.g., the file is malicious) and a score of 1 indicating a very high trustworthiness (e.g., the file is legitimate).

The TTL specifies the period of time that the associated reputation score is valid. Depending upon the embodiment, the TTL can be specified as a length of time after a specified event (e.g., the reputation score is valid for one week after receipt of the score by the client system 110), as an explicit date (e.g., the reputation score is valid until Jul. 1, 2012), or in another manner.

The security system 120 is a hardware device and/or software program configured to receive information about computer files (e.g., their behaviors) from the client system 110 and other sources, generate reputation scores for these files, and determine associated TTLs based on the reputation scores and confidence in the reputation scores. The security system 120 also receives requests from the client system 110 for reputation scores of particular files, and provides their current reputation scores and TTLs in response. An example of the security system 120 is a web-based system providing security software and services allowing the security module 115 to detect and remediate malware on the client system 110.

The security system 120 generates the reputation score for a file based on attributes that correlate to the trustworthiness of the file. For example, the security system 120 can analyze a reputation of the source(s) of the file (e.g., whether the file was downloaded from a reputable website or from a less reputable website), can analyze whether the file is signed with a digital signature (e.g., a file digitally signed by a reputable entity is more trustworthy than a file signed by a less reputable entity or a file without a digital signature) and whether the file is prevalent among the client system 110, to name a few.

The security system 120 determines a confidence score for a generated reputation score. The confidence score measures the confidence the security system 120 has in the reputation score (i.e., the likelihood of the reputation score reflecting the true trustworthiness of the underlying file). For example, the confidence score can be a continuous value ranging from 0 to 1, which a score of 0 indicating a very low confidence (e.g., the indication value of the reputation score is very low) and a score of 1 indicating a very high confidence (e.g., the reputation score almost certainly reflects the true trustworthiness of the underlying file).

The security system 120 determines the confidence score based on attributes that correlate to the confidence in the generated reputation score, such as the value of the reputation score, the underlying file's age (i.e., how long the security system 120 has known about the file), and the file's prevalence across the user base of the security system 120.

The security system 120 computes the TTL based on attributes that correlate to the trustworthiness of the file (i.e., the reputation score) and the confidence score for the reputation score. Generally, the security system 120 sets long TTLs for reputation scores with high confidence scores, and sets short TTLs for reputation scores with low confidence scores. In other words, the TTL represents an assessment of the length of time it takes for the security system 120 to collect enough additional related information that may cause the security system 120 to generate a materially different reputation score for the file. If the assessment of trustworthiness of a file is unlikely to change for a long time, the TTL is long, and otherwise short. By setting long TTLs for reputation scores with high confidence scores, the client system 110 relies on such reputation scores for a long period of time before requesting an update from the security system 120.

One or more of the functions of the security system 120 can also be executed on the client system 110 or in a cloud computing environment. As used herein, cloud computing refers to a style of computing in which dynamically scalable and often virtualized resources are provided as a service over the Internet. Thus, cloud computing customers generally do not own the physical infrastructure serving as host to the software platform in question, but instead rent usage of resources from a third-party provider, where consume these resources as a service and pay only for resources used.

The network 130 enables communications between the client system 110 and the security system 120. In one embodiment, the network 130 uses standard communications technologies and/or protocols. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 130 can also include links to other networks such as the Internet.

Computer Architecture

Figure 2:
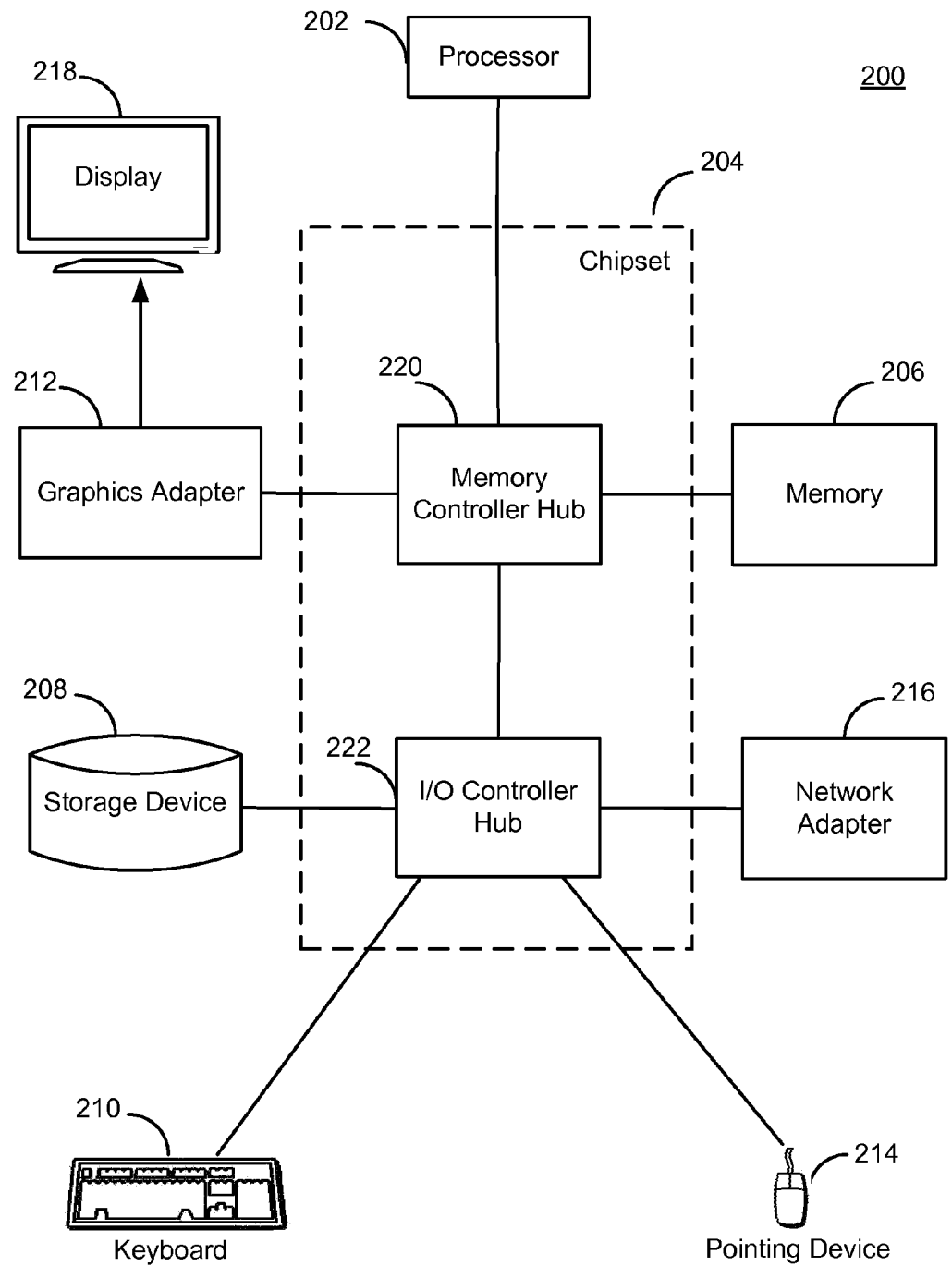
FIG. 2 is a high-level block diagram illustrating an example of a computer for use in the computing environment shown in FIG. 1 according to one embodiment of the present disclosure.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the security system 120 might comprise multiple blade servers working together to provide the functionality described herein. As another example, the client system 110 might comprise a mobile telephone with limited processing power. The computers 200 can lack some of the components described above, such as keyboards 210, graphics adapters 212, and displays 218.

Example Architectural Overview of the Security Module

Figure 3:
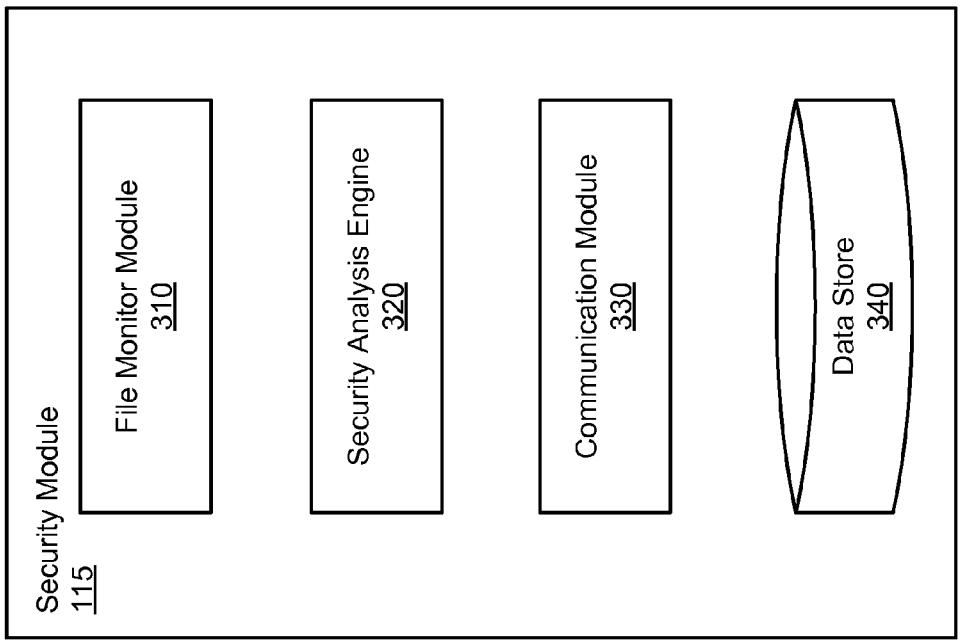
FIG. 3 is a high-level block diagram illustrating modules within a security module according to one embodiment of the present disclosure.

FIG. 3 is a high-level block diagram illustrating a detailed view of modules within the security module 115 according to one embodiment. Some embodiments of the security module 115 have different and/or other modules than the ones described herein. Similarly, the functions can be distributed among the modules in accordance with other embodiments in a different manner than is described here. As illustrated, the security module 115 includes a file monitor module 310, a security analysis engine 320, a communication module 330, and a data store 340.

The file monitor module 310 continuously monitors computer files within the client system 110 and collects related information such as their sources (e.g., the websites from which the files were downloaded), digital signatures, behaviors, and system properties such as the dates of creation and the dates of last modification. Such related information is collectively called the "metadata" of the associated files.

The security analysis engine 320 determines whether the monitored files are malicious based on factors such as their metadata and reputation scores. In one embodiment, the security analysis engine 320 makes the determination for a file when a suspicious behavior (e.g., an attempt to write to the system registry) is observed for that file. For example, the security analysis engine 320 can determines that a first file with a good reputation (i.e., high reputation score) that attempts to write to the registry is probably not malware, and that a second file with a bad reputation (i.e., low reputation score) that attempts to write to the registry is probably malware.

If the file does not have a reputation score or if the reputation score for the file is expired (i.e., as indicated by its TTL), the security analysis engine 320 coordinates with the communication module 330 to request a current reputation score and an associated TTL from the security system 120. Otherwise, if the file is associated with a valid reputation score (e.g., the validity period has not ended), the security analysis engine 320 determines whether the file is malicious based on the reputation score and other factors such as the metadata.

In one embodiment, the security analysis engine 320 creates a black list of files determined malicious and a white list of files determined legitimate. If the verdict for a file (i.e., whether the file is malicious) changes, for example, because of a subsequent reputation score change, the security analysis engine 320 updates the black list and/or white list accordingly.

The communication module 330 communicates with the security system 120 to determine the reputation scores and corresponding TTLs for the monitored files. The communication module 330 transmits an identifier of the file (e.g., a digital fingerprint) and related information (e.g., the metadata) to the security system 120, and receives a reputation score and an accompanying TTL in response. In one embodiment, instead of or in addition to the identifier, the file itself can be transmitted to the security system 120. The communication module 330 stores the reputation score and the TTL in the data store 340 together with other related information for the file.

The data store 340 stores data used by the client system 110. Examples of such data include identifiers of the computer files resided on the client system 110 and their metadata, reputation scores, and associated TTLs, and information about the security system 120 (e.g., IP address). The data store 340 may be a relational database or any other type of database.

Example Architectural Overview of the Security System

Figure 4:
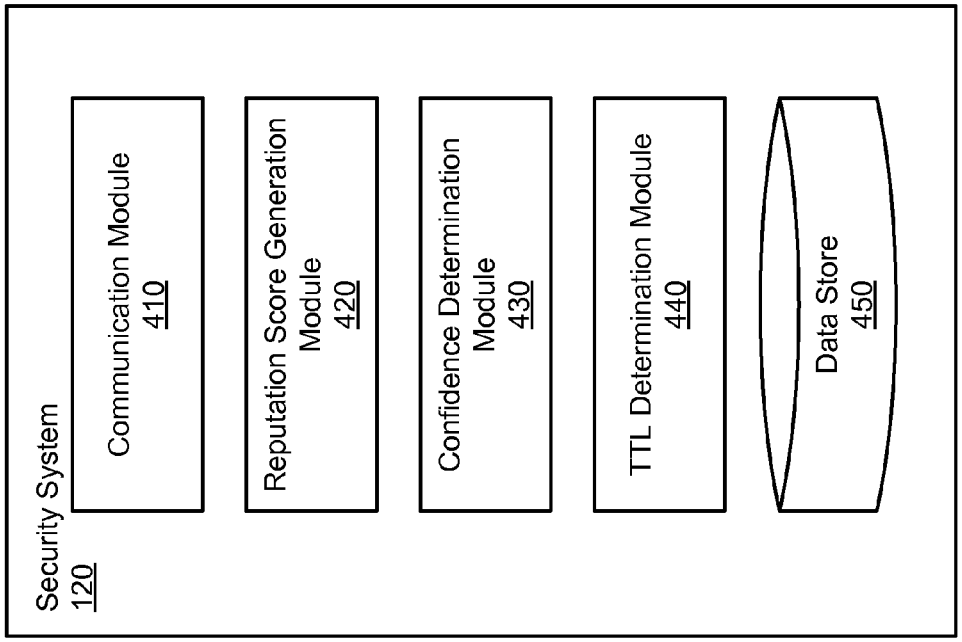
FIG. 4 is a high-level block diagram illustrating modules within a security system according to one embodiment of the present disclosure.

FIG. 4 is a high-level block diagram illustrating a detailed view of modules within the security system 120 according to one embodiment. Some embodiments of the security system 120 have different and/or other modules than the ones described herein. Similarly, the functions can be distributed among the modules in accordance with other embodiments in a different manner than is described here. As illustrated, the security system 120 includes a communication module 410, a reputation score generation module 420, a confidence determination module 430, a TTL determination module 440, and a data store 450.

The communication module 410 receives inquiries from the security modules 115 running on the client system 110 and provides responses to the security modules 115. The inquiries include identifiers of computer files and may also include metadata for the files. The responses include reputation scores for the identified files and TTLs of the reputation scores. The communication module 410 contacts the reputation score generation module 420 and the TTL determination module 440 for the current reputation scores and associated TTLs, accordingly. The communication module 410 also receives information related to computer files from client system 110 and other resources and stores the received information in the data store 450.

The reputation score generation module 420 generates reputation scores for computer files. As described above, a reputation score is an assessment of the trustworthiness of the associated file. The reputation score generation module 420 generates the reputation score based on attributes that correlate to the trustworthiness of the file. Examples of such attributes include the prevalence (or popularity) of the file among the user base of the security system 120, the reputation of sources of the file, the reputation scores of other files resided on the same client system 110 with the file, and the observed behaviors of the file, to name a few. In one embodiment, the reputation score generation module 420 continuously generates reputation scores as requests and information about computer files are received from the client system 110 and other sources.

The confidence determination module 430 determines the confidence scores for the reputation scores generated by the reputation score generation module 420. As described above, a confidence score measures the confidence the security system 120 has in the generated reputation score. The confidence determination module 430 determines the confidence score based on attributes that correlate to the confidence in the generated reputation score. Examples of such attributes include the value of the reputation score, the file's age (i.e., how long the security system 120 has known about the file), and the file's prevalence across the user base of the security system 120.

A reputation score that is on or near the extreme ends of the spectrum serves as an indication of high confidence in the reputation score, since such a reputation score is unlikely to change materially over time. For example, if a reputation score is close to 0, the low end of the spectrum, indicating that the associated file is almost certainly malicious, the chance that the reputation score will change substantially over time is close to zero. In one embodiment, reputation scores are organized into the following reputation bands: extreme (higher than 0.95 or less than 0.05), decisive (between 0.95 and 0.8 or between 0.05 and 0.2), marginally decisive (between 0.7 and 0.8 or between 0.2 and 0.3), and indecisive (between 0.3 and 0.7).

The length of time the security system 120 has known about a file is another indicator of confidence in the reputation score of the file. If a file is relatively new to the security system 120, the confidence of the reputation score is low since the security system 120 probably has not collected enough information to make a good assessment of its trustworthiness. As the file becomes more familiar to the security system 120, the confidence in the reputation score increases, since the security system 120 is likely to have collected more information and can make a better assessment. In addition, if the security system 120 has known about the file for a long time, the chance of new information that will materially change the reputation score surfacing in the near future is also low. In one embodiment, file ages are organized into the following age bands: old (greater than 6 months), middle-aged (equal or less than 6 months, older than 3 months), young (equal or less than 3 months, older than 1.5 months); very young (equal or less than 1.5 months).

The prevalence of a file across the user base of the security system 120 is also an indicator of confidence in the reputation score of the file. Files that are more prevalent tend to be better known to the security system 120, and as a result the security system 120 tends to have more information about such prevalent files, boosting confidence of their reputation scores. In one embodiment, file prevalence is categorized into the following prevalence bands: very high (more than 50,000 machines), high (equal or less than 50,000, more than 25,000), medium (equal or less than 25,000, more than 10,000), low (equal or less than 10,000, more than 1,000), very low (equal or less than 1,000).

The confidence determination module 430 determines the confidence scores by collectively considering multiple confidence indicators such as the ones described above. For example, the confidence determination module 430 can determine the confidence scores by walking through the following table:

| Prevalence | Age | Reputation | Confidence Score |
|---|---|---|---|
| Medium | Old | Indecisive | Very High |
| Very High | Old | Extreme | Very High |
| High | Old | Decisive | Very High |
| Medium | Middle-Aged | Marginally Decisive | High |
| High | Young | Marginally Decisive | Low |
| Low | Young | Extreme | Low |
| Very Low | Very Young | Marginally Decisive | Low |
| Very Low | Very Young | Extreme | Low |
| Very Low | Very Young | Marginally Decisive | Very Low |
| Very Low | Very Young | Indecisive | Very Low |

The confidence determination module 430 can take the confidence score for the reputation score of a file from the first row (from top down) in the table for which the attributes of the file meet or exceed what is specified in each category. To simplify the issue, the confidence scores determined using the above table has one of the following four values: very high, high, low, and very low.

The TTL determination module 440 determines TTLs for reputation scores generated by the reputation score generation module 420. As described above, a TTL describes the validity period for its associated reputation score. The TTL determination module 440 determines a TTL based on the associated reputation score and the confidence score determined for the reputation score. Continuing with the above example, the TTL determination module 440 can determine the TTLs by walking through the following table in a similar manner:

| Reputation | Confidence Score | TTL |
|---|---|---|
| Decisive | Very High | One Year |
| Marginally Decisive | High | One Month |
| Marginally Decisive | Low | One Week |
| Indecisive | Very Low | One Day |

To simplify the issue, the TTLs determined using the above table has one of the following four values: one year, one month, one week, and one day.

The data store 450 stores data used by the security system 120. Examples of such data include information related to computer files (e.g., identifiers such as digital fingerprints, metadata, past/current reputation scores and TTLs), websites, digital signatures, and client system 110, to name a few. Information related to files can be grouped together and indexed by file identifiers to facilitate rapid retrieval. Similar to the data store 340, the data store 450 may be a relational database or any other type of database.

Overview of Methodology for the Security Module

Figure 5:
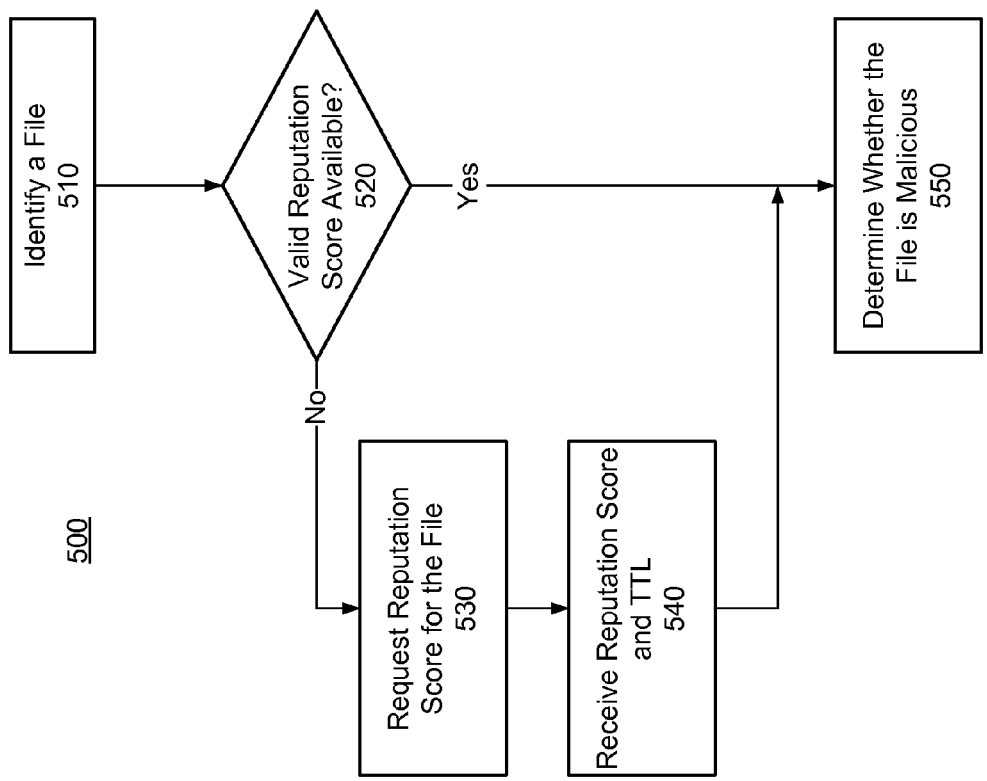
FIG. 5 is a flow diagram illustrating a process for determining whether a computer file is malicious based on a reputation score and an individualized time-to-live (TTL) for the reputation score according to one embodiment of the present disclosure.

FIG. 5 is a flow diagram illustrating a process 500 for the security module 115 to determine whether a computer file is malicious based on a reputation score and an individualized TTL for the reputation score, according to one embodiment. Other embodiments can perform the steps of the process 500 in different orders. Moreover, other embodiments can include different and/or additional steps than the ones described herein.

Initially, the security module 115 running on the client system 110 identifies 510 a computer file for security examination. For example, the security module 115 monitors files residing on the client system 110, observes an attempt to perform a suspicious activity by one of the monitored files, and identifies 510 that file for security examination.

The security module 115 determines 520 whether the identified file has a valid reputation score available. For example, the security module 115 searches in the data store 340 for the presence of a reputation score associated with the identified file and the accompanying TTL. If no such reputation score is present or the available reputation score is already expired (i.e., as indicated by the TTL), the security module 115 determines 520 that no valid reputation score is available. Otherwise, if a reputation score for the identified file is present in the data store 340 and the validity period defined by the accompanying TTL has not ended, the security module 115 assumes the reputation score to be a valid assessment of the trustworthiness of the identified file, and determines 520 that the identified file has a valid reputation score available.

If the security module 115 has a valid reputation score available for the identified file, the security module 115 determines 550 whether the file is malicious based on the reputation score and other factors such as the observed behaviors of the identified file. The security module 115 can further determine whether to allow any attempt to perform suspicious activities by the identified file based on whether the file is determined malicious.

If no valid reputation score is available, the security module 115 requests 530 a reputation score for the identified file from the security system 120. For example, the security module 115 transmits to the security system 120 a request including an identifier of the file (e.g., the digital fingerprint). The security module 115 may also transmit metadata (e.g., observed behavior) for the identified file to the security system 120 along with the request. The security module 115 then receives 540 a reputation score and an accompanying TTL from the security system 120 in response to the request 530. Once the security module 115 receives the reputation score from the security system 120, the security module 115 determines 550 whether the file is malicious as described above.

Overview of Methodology for the Security System

Figure 6:
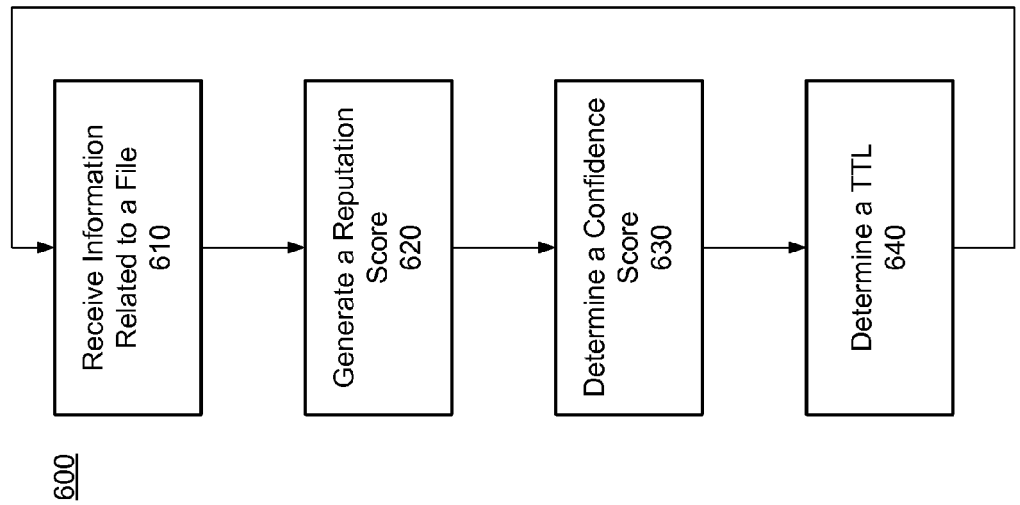
FIG. 6 is a flow diagram illustrating a process for continuously generating a current reputation score and an accompanying individualized TTL for the reputation score for a computer file according to one embodiment of the present disclosure.

FIG. 6 is a flow diagram illustrating a process 600 for the security system 120 to continuously generate a current reputation score and an accompanying individualized TTL for the reputation score for a computer file, according to one embodiment. Other embodiments can include different and/or additional steps than the ones described herein.

The security system 120 receives 610 information related to a computer file. Examples of the related information include an identifier of the computer file (e.g., digital signature), observed behaviors, source(s), prevalence (e.g., the client system 110 hosting the file), and age (e.g., how long the file exists on a particular the client system 110), to name a few. The security system 120 receives 610 the information from sources such as the security module 115 running on the client system 110, the data store 450, and other sources. The security system 120 stores the related information received from the security module 115 in the data store 450.

The security system 120 generates 620 a current reputation score for the file based on the received information, determines 630 a confidence score for the generated reputation score, and determines 640 a TTL for the generated reputation score based on factors including the reputation score and the confidence score. The reputation score along with the TTL and the confidence score can be stored in the data store 450 as the current reputation score for the computer file.

The process 600 is repeated continuously to generate updated reputation scores and TTLs that account for newly-received related information for the file. The security system 120 may repeat the process 600 when new related information is received, when receiving a request for the current reputation score and TTL of the file, or at a predetermined time interval. For example, the security system 120 receives 610 a request for a reputation score for a file along with metadata of that file from the security module 115, generates 620 a reputation score taking into account the received metadata, and determines 630, 640 a confidence score and a TTL, and returns the reputation score and the TTL to the security module 115.

This approach intelligently determines an individualized TTL for a reputation score of a particular file based on attributes of the file that reflect the confidence in the reputation score. As a result, the number of requests the security modules 115 transmit to the security system 120 regarding files that are highly likely to be good or bad (i.e., files with high-confidence reputation scores) are reduced, and therefore the performances of the client system 110 and the security system 120 are improved. Thus, by utilizing individualized TTLs, this approach advantageously achieves a tradeoff between providing satisfying real-time security to the client systems 110 and maintaining backend performance and scalability.

Additional Embodiments

In one embodiment, at least a part of the security system 120 can be implemented in the security module 115 running on the client system 110 such that the client system 110 locally generates reputation scores and TTLs for computer files and does not re-generate the reputation scores until their TTLs expire.

In another embodiment, the TTL provided by the security system 120 can be further customized by the client system 110 based on its local security policy. For example, if the client system 110 has low security policies in place (e.g., computers in an Internet café) then the client system 110 can extend the TTLs of the reputation scores by a pre-determined and customizable factor. On the other hand, if the client system 110 enforces stringent local security policies, then the client system 110 may reduce the TTLs provided by the security system 120.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for generating and utilizing individualized TTLs for reputation scores of computer files. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for generating an individualized time-to-live (TTL) for a reputation score of a file, comprising:
   receiving, at a security system, a request from a client system, the request comprising an identifier of a file identified by the client system;
   generating a reputation score of the file based on reputation information of the file received from a plurality of client systems, the reputation score representing an assessment of a trustworthiness of the file;
   determining a confidence score for the reputation score based on the reputation information received from the plurality of client systems, the confidence score measuring a likelihood of the reputation score reflecting actual trustworthiness of the file, wherein determining the confidence score comprises at least one of:
      determining an age of the file, wherein the confidence score for a reputation score associated with an old file is higher than the confidence score for a reputation score associated with a young file; and
      determining a prevalence of the file among client systems, wherein the confidence score for a reputation score associated with a prevalent file is higher than the confidence score for a reputation score associated with a less prevalent file;
   computing, by the security system, a TTL for the reputation score based on the reputation information received from the plurality of client systems and the confidence score, the TTL describing a validity period for the reputation score, wherein a validity period described by a TTL for a reputation score associated with a high confidence score is longer than a validity period described by a TTL for a reputation score associated with a low confidence score; and
   transmitting the reputation score and the TTL to the client system in response to the request.

2. The computer-implemented method of claim 1, wherein the confidence score for a reputation score on or near extreme ends of its spectrum is higher than the confidence score for a reputation score not at the extreme ends.

3. The computer-implemented method of claim 1, wherein the reputation score is utilized by the client system to determine whether the file is malicious during the validity period described by the TTL.

4. The computer-implemented method of claim 1, wherein the TTL represents an assessment of a length of time it takes to collect additional information that may result in a different reputation score for the file.

5. The computer-implemented method of claim 1, wherein computing the TTL comprises selecting the TTL from a table specifying values of TTLs for given values of the reputation score and the confidence score.

6. The computer-implemented method of claim 1, wherein the client system is configured to receive the transmitted TTL from the security system and to change the TTL received from the security server based on a local security policy of the client system.

7. The computer-implemented method of claim 1, wherein the security system does not receive the TTL from the client system.

8. A computer system for generating an individualized time-to-live (TTL) for a reputation score of a file, comprising:
   a processor for executing computer program code; and
   a non-transitory computer-readable storage medium storing executable computer program code comprising:

a communication module for receiving a request from a client system at a security system, the request comprising an identifier of a file identified by the client system;

a reputation score generation module for generating a reputation score of the file based on reputation information received from a plurality of client systems, the reputation score representing an assessment of a trustworthiness of the file;

a confidence determination module for determining a confidence score for the reputation score based on the reputation information received from the plurality of client systems, the confidence score measuring a likelihood of the reputation score reflecting actual trustworthiness of the file, wherein determining the confidence score comprises at least one of:

determining an age of the file, wherein the confidence score for a reputation score associated with an old file is higher than the confidence score for a reputation score associated with a young file; and determining a prevalence of the file among client systems, wherein the confidence score for a reputation score associated with a prevalent file is higher than the confidence score for a reputation score associated with a less prevalent file; and a TTL determination module for computing a TTL for the reputation score based on the reputation information received from the plurality of client systems and the confidence score, the TTL describing a validity period for the reputation score, wherein a validity period described by a TTL for a reputation score associated with a high confidence score is longer than a validity period described by a TTL for a reputation score associated with a low confidence score;

wherein the communication module is further configured for transmitting the reputation score and the TTL to the client system in response to the request.

9. The computer system of claim 8, wherein the confidence score for a reputation score on or near extreme ends of its spectrum is higher than the confidence score for a reputation score not at the extreme ends.

10. The computer system of claim 8, wherein the reputation score is utilized by the client system to determine whether the file is malicious during the validity period described by the TTL.

11. The system of claim 8, wherein the security system does not receive the TTL from the client system.

12. A non-transitory computer-readable storage medium encoded with executable computer program code for generating an individualized time-to-live (TTL) for a reputation score of a file, the computer program code comprising program code for:

receiving, at a security system, a request from a client system, the request comprising an identifier of a file identified by the client system;

generating a reputation score of the file based on reputation information received from a plurality of client systems, the reputation score representing an assessment of a trustworthiness of the file;

determining a confidence score for the reputation score based on the reputation information received from the plurality of client systems, the confidence score measuring a likelihood of the reputation score reflecting actual trustworthiness of the file, wherein determining the confidence score comprises at least one of:

determining an age of the file, wherein the confidence score for a reputation score associated with an old file is higher than the confidence score for a reputation score associated with a young file; and determining a prevalence of the file among client systems, wherein the confidence score for a reputation score associated with a prevalent file is higher than the confidence score for a reputation score associated with a less prevalent file;

determining a TTL for the reputation score based on the reputation information received from the plurality of client systems and the confidence score, the TTL describing a validity period for the reputation score, wherein a validity period described by a TTL for a reputation score associated with a high confidence score is longer than a validity period described by a TTL for a reputation score associated with a low confidence score; and transmitting the reputation score and the TTL to the client system in response to the request.

13. The computer-readable storage medium of claim 12, wherein the confidence score for a reputation score on or near extreme ends of its spectrum is higher than the confidence score for a reputation score not at the extreme ends.

14. The computer-readable storage medium of claim 12, wherein the security system does not receive the TTL from the client system.

* * * * *